US005133804A

United States Patent [19]

Culpon, Jr.

[11] Patent Number: 5,133,804

[45] Date of Patent: Jul. 28, 1992

[54] MOLD RELEASE AGENT AND METHOD FOR MOLDING CERAMICS

[75] Inventor: Douglas H. Culpon, Jr., Port Neches, Tex.

[73] Assignee: Texaco Inc., White Plains, N.Y.

[21] Appl. No.: 556,058

[22] Filed: Jul. 23, 1990

[51] Int. Cl.[5] .................. B23B 7/36

[52] U.S. Cl. .................. 106/38.24; 106/38.22; 106/267; 264/56

[58] Field of Search .................. 106/38.24, 38.22, 267

[56] References Cited

U.S. PATENT DOCUMENTS

| | | | |
|---|---|---|---|
| 2,245,651 | 6/1941 | Craig | 106/38.24 |
| 3,574,112 | 4/1971 | Nelson | 106/38.24 |
| 4,071,368 | 1/1978 | Jones | 264/338 |
| 4,740,324 | 4/1988 | Schur | 252/56 R |
| 4,886,838 | 12/1989 | Dewhurst | 264/328.1 |

FOREIGN PATENT DOCUMENTS

| | | | |
|---|---|---|---|
| 54116018 | 9/1979 | Japan | 106/38.24 |

*Primary Examiner*—James Derrington
*Attorney, Agent, or Firm*—Jack H. Park; Kenneth R. Priem; Richard A. Morgan

[57] ABSTRACT

A mold release composition has been discovered. The composition comprises 20% high erucic acid rapeseed oil and 4% tall oil fatty acids in kerosene. The composition demonstrated no objectional smoke generation during calcining of molded ceramic articles. The composition demonstrated adequate mold release and surface finish.

8 Claims, No Drawings

MOLD RELEASE AGENT AND METHOD FOR MOLDING CERAMICS

BACKGROUND OF THE INVENTION

1. Field Of The Invention

The invention relates to a mold release composition. The invention also relates to a method of producing molded ceramic articles. The invention particularly relates to mold release compositions which generate low amounts of smoke in the production of molded ceramic articles.

2. Description Of Other Related Methods In The Field

It is well-known to use a mold release agent natural or synthetic compounds such as silicone oil, mineral oils, waxes, aliphatic acid derivatives, glycols or inorganic materials such as talc or mica to produce molded articles such as polymeric materials, cement and ceramics. The mold release agent is typically applied to the mold pattern surface prior to introducing the molding composition to the mold. The molded article is then demolded and optionally dried and/or baked to achieve the final properties of the molded ceramic article. In demolding, amounts of mold release agent transfer to the molded article. In particular, mineral oil base mold release agents transfer to the molded article in relatively large amounts. In the drying or baking steps these mineral oils decompose with the evolution of smoke. Amounts of smoke may adhere to the ceramic article diminishing the uniformity of appearance of the final product. There is a need in the art for an oil base mold release agent with reduced smoke producing characteristics.

U.S. Pat. No. 4,886,838 to J. E. Dewhurst teaches an internal mold release agent for use in reaction injection molding. The mold release agent comprises compounds based on $C_8$ to $C_{24}$ fatty acids including tall oil fatty acids and oleic acid.

U.S. Pat. No. 4,740,324 to H. Schur teaches an oil base mold release agent. Preferred oils include rape seed oil and soya oil. Tall resin obtained by fractional distillation of tall oil is incorporated into the composition. Lubricating oil is also included.

U.S. Pat. No. 4,071,368 to J. R. Jones teaches petroleum distillate fractions such as kerosene in mold release compositions and the undesirability of compositions which produce smoke.

SUMMARY OF THE INVENTION

The invention is a mold release composition. The composition comprises 10 to 50 vol% of a vegetable oil selected from the group consisting of rapeseed oil and soybean oil; 1 to 10 vol% of a $C_8$ to $C_{24}$ fatty acid and mixtures thereof and a light distillate oil. Preferably in the composition, the vegetable oil comprises 15 to 25 vol% and the fatty acid comprises 2 to 6 vol%. When applied to a mold pattern surface or mixed with clay, the composition enhances the separation of a molded article from the mold. Residual amounts of the composition adhering to the molded article, decompose at 300° F. to 600° F. with minimal smoke generation in the drying and calcining of the molded article.

DESCRIPTION OF THE PREFERRED EMBODIMENTS

The mold release compositions of the invention comprise a vegetable oil, a fatty acid and a light distillate oil.

The vegetable oil is rapeseed oil or soybean oil. Both oils are commercially available.

Rapeseed oil is preferred based on its low smoke generation at its flash point of 325° F. Rapeseed oil is also advantageous for its lubricity. Rapeseed oil is high in unsaturated acids, particularly erucic acid, oleic acid and linoleic acid. Rapeseed oil is sold in grades based on erucic acid content. High erucic acid rapeseed oil has a minimum of 47 vol% erucic acid, typically 47 to 50 vol%. Low erucic acid rapeseed oil is less than 2 vol% erucic acid, typically 0.5 to 1.0 vol% and is also known as canola oil. Preferably in the composition, the vegetable oil comprises 15 to 25 vol% and the fatty acid comprises 2 to 6 vol%. Erucic acid is a $C_{22}$ fatty acid homolog of oleic acid with an additional four carbon atoms. The best low smoke forming compositions were made with rapeseed oil containing at least 47% erucic acid, preferably more.

The fatty acid of the invention is a $C_8$ to $C_{24}$, branched or straight chain fatty acid which may be saturated or unsaturated. Examples include stearic acid, palmitic acid and oleic acid which are available commercially as a mixture known as tall oil fatty acids. Additional examples include a coconut fatty acid mixture, tallow or train-oil fatty acids, paraffin fatty acids, decylic acid, linoleic acid, ricinoleic acid, 2-ethyl hexanoic acid and the like. Oleic acid is preferred. Tall oil fatty acids are most preferred. These fatty acids and fatty acid mixtures are commercially available in a number of grades based on purity.

The light distillate oil of the invention is a product of the refining of crude petroleum. A light distillate fraction includes commercially available fractions available as kerosene, naphtha, fuel oil, signal oil, mineral oil, mineral seal oil and the like.

The compositions are compounded from commercially available materials in a 200 gallon steam jacketed kettle equipped with an electric motor drive stirrer. A measured amount of the liquid vegetable oil is introduced into the kettle and heated with stirring to 80° F. to 100° F. An increment of fatty acid is added by hand. Tall oil fatty acid is liquid. Oleic acid is solid at room temperature. When the increment is fully mixed the next increment is added until the required amount has been incorporated. A characterizing dye may be added. The mixture is stirred and allowed to cool to room temperature. After sampling for quality and uniformity, the concentrate is canned and labeled.

The mold release agent is used to enhance the separation of a molded article from the mold. Before use, the concentrate is thinned with a mineral oil such as Avjet A/Naphthenic Pale Oil. The mold release agent is applied to the mold pattern surface by brush coating or spraying the dry, room temperature surface with an amount which entirely covers the surface and is sufficiently thin that it does not run, mask the pattern or alter the surface appearance. In the alternative the agent is mixed with the clay molding composition.

A measured amount of clay molding composition is thrown into the mold and the mold closed, forming the clay into a molded article, e.g. an electric insulator. The mold is opened and the molded article falls away from the mold without manual assistance. The molded article is dried at 300° F. to 600° F. in a drying oven. Residual amounts of mold release composition decompose with minimal smoke generation. The dried article is then calcined at about 1000° F. to achieve the properties of the ceramic article. The ceramic article is characterized as absent of any color from smoke.

This invention is shown by way of Example.

EXAMPLE 1-A

Open cups of mold oil components were heated overnight in a small electric oven at 300° F. No smoke was observed. Color change was attributed to degradation and darkening of the liquid oil. The following results were recorded:

TABLE 1

DRYING OVEN RESULTS ON MOLDED OIL COMPONENTS

| COMPONENT TESTED | % WEIGHT LOSS | STARING APPEARANCE | FINAL APPEARANCE |
|---|---|---|---|
| 1. N100 Pale Oil | 27.3 | Pale | Pale |
| 2. SNO 100 | 15.6 | Lt Pale | Dk Brown |
| 3. SNO 320 | 0 | Dk Pale | Brown |
| 4. White Oil 22 | 31.8 | Water White | Water White |
| 5. Acintol FA-2 | 11.3 | Lt Pale | Amber |
| 6. High Erucic Acid Rapeseed oil | 0.7 | Pale | Lt Pale |
| 7. Low Erucic Acid Rapeseed oil | 0 | Lt Pale | Lt Pale |
| 8. Soybean Oil | 0 | Pale | Lt Pale |
| 9. Oleic Acid | 8.2 | Pale | Dk Pale |
| 10. 12-OH Stearic Acid | 4.1 | Cloudy, White Solid | |

EXAMPLES 1-B

The mold oil components were mixed with dry sand and heated to 500° F. The following results were observed.

TABLE II

CALCINING OVEN RESULTS ON MOLD OIL COMPONENT MIXED WITH SAND

| COMPONENT TESTED | SMOKE OBSERVED | TIME (MIN.) UNTIL SMOKE GENERATION |
|---|---|---|
| 1 N100 Pale Oil | Blue/Grey Smoke | 5 |
| 2. SNO 100 | Blue/Grey Smoke | 2 |
| 3. SNO 320 | Grey Smoke | 6 |
| 4. White Oil 22 | Blue/Grey Smoke | 2 |
| 5. Acintol FA-2 | Blue Smoke | 3 |
| 6. High Erucic Acid Rapeseed Oil | Slight Grey Smoke | 9 |
| 7. Low Erucic Acid Rapeseed Oil | Trace Grey Smoke | 7 |
| 8. Soybean Oil | Trace Grey Smoke | 18 |
| 9. Oleic Acid | Blue/Grey Smoke | 3 |
| 10. 12-OH Stearic Acid | Blue/Grey Smoke | 6 |

EXAMPLE 1-C

After Examples 1-A and 1-B were completed, the following mold release compositions were formulated:

TABLE III

CERAMIC MOLD OIL FORMULATIONS

| | A | B | C |
|---|---|---|---|
| Kerosene | 76% | 76% | 76% |
| Soybean Oil | 20% | 20% | — |
| Rapeseed Oil - high erucic acid | — | — | 20% |
| Acintol FA-3 | 4% | — | 4% |
| Oleic Acid | — | 4% | — |
| Gravity, API | 40° | 40.1° | 40.3° |
| Flash Pt. (Penske-Martin, closed cup) °F. | 124 | 125 | 127 |
| Viscosity, cSt @ 40° C. | 2.5 | 2.5 | 3.8 |
| Neutralization No. | 8.8 | 9.1 | 8.8 |
| Color, ASTM | L0.5 | L0.5 | L0.5 |

The formulations were tested in a commercial molding operation. In the test batch 420 oz. mold oil was premixed with 850 lb. of molding clay. The premixed batch was molded in commercial equipment. Adequate mold release and surface finish were observed. No smoke was observed when the molded articles were calcined at 1000° F.

GLOSSARY

N100 Pale Oil - Naphthenic 100 SUS base oil

SNO 100-100 SUS solvent neutral oil, paraffinic petroleum distillate

SNO 320 - 320 SUS solvent neutral oil, paraffinic petroleum distillate

White Oil 22-22 cSt light petroleum distillate

Acintol FA-2 - Arizona Chemical, tall oil fatty acids, 97.8% fatty acids, 44% linoleic acid, 50% oleic acid, Gardner color 3+

Acintol FA-3 - Arizona Chemical, tall oil fatty acids, 98.8% fatty acids, 45% linoleic acid, 50% oleic acid, Gardner color 2+

High erucic acid rapeseed oil - 47% minimum erucic acid, 47%-50% typical

Low erucic acid rapeseed oil - less than 2% erucic acid, 0.5%-1.0% typical

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. A mold release composition comprising:

15 to 25 vol% of a vegetable oil selected from the group consisting of rapeseed oil and soybean oil, 2 to 6 vol% of a $C_8$ to $C_{24}$ fatty acid and mixtures thereof, and the balance kerosene.

2. The composition of claim 1 wherein the vegetable oil is rapeseed oil.

3. The composition of claim 1 wherein the vegetable oil is rapeseed oil comprising at least 47 vol% erucic acid.

4. The composition of claim 1 wherein the vegetable oil is soybean oil.

5. The composition of claim 1 wherein the fatty acid is tall oil fatty acids.

6. The composition of claim 1 wherein the fatty acid is oleic acid.

7. A mold release composition comprising: about 15 to 25 vol% rapeseed oil, about 2 to 6 vol% of a fatty acid selected from the group consisting of tall oil fatty acid and oleic acid, and the balance kerosene.

8. A mold release composition comprising: about 15 to 6 vol% soybean oil, about 2 to 6 vol% of a fatty acid selected from the group consisting of tall oil fatty acid and oleic acid and the balance kerosene.

* * * * *